United States Patent
Pistiner

[11] 3,722,682
[45] Mar. 27, 1973

[54] LIQUID FILTERING APPARATUS

[76] Inventor: Irving Pistiner, 1401 Jessup Avenue, Bronx, N.Y. 10452

[22] Filed: Aug. 11, 1971

[21] Appl. No.: 170,849

[52] U.S. Cl. ................................ 210/123, 210/387
[51] Int. Cl. ............................................ B01d 29/02
[58] Field of Search ..................... 210/106–108, 386, 210/387, 400, 401, 123

[56] References Cited

UNITED STATES PATENTS

| | | | |
|---|---|---|---|
| 2,867,324 | 1/1959 | Hirs | 210/387 X |
| 3,305,094 | 2/1967 | Casson | 210/387 X |
| 3,333,693 | 8/1967 | Hirs | 210/387 X |

*Primary Examiner*—John Adee
*Attorney*—Polachek, Saulsbury & Hough

[57] ABSTRACT

A self contained liquid filtering apparatus has been provided. A filtering chamber is provided at the top of an elongated frame structure and this frame structure supports also toggle actuated devices for opening and closing end gates at the open ends of the filtering chamber in order to permit the advancing of a filtering sheet that is taken from a roll supported upon the frame and is drawn by a motorized roller through the end openings of the filtering chamber upon the end gates being lifted by toggle devices. The dirtied paper is drawn from the filtering chamber and disposed of in a tray lying within the frame structure of the apparatus arranged to receive drippings from one end opening of the filtering chamber and the drippings from the other end of the filtering chamber are delivered to the tray by an inclined drain plate. An evacuating apparatus is provided within the frame structure for removing the liquid from the filtering chamber prior to the opening of the end gates and the advancing of the filtering paper from its roll and adapted to return the liquid to the filtering chamber when the new filter area has been provided. The filtered liquid removed from the filtering chamber may be collected in a tank and returned to the filtering chamber so as to be refiltered. Fluid cylinder devices are used for the actuation of the toggle gate operating mechanisms and for the evacuating cylinder device appropriate valves are used in the liquid pipelines to control the flow of the liquid into and out of the filtering chamber. A pushbutton control box is mounted on one end of the frame structure and can control the various fluid cylinder control valves of magnetic type and the liquid control valves may similarly be controlled electrically.

9 Claims, 6 Drawing Figures

INVENTOR,
IRVING PISTINER

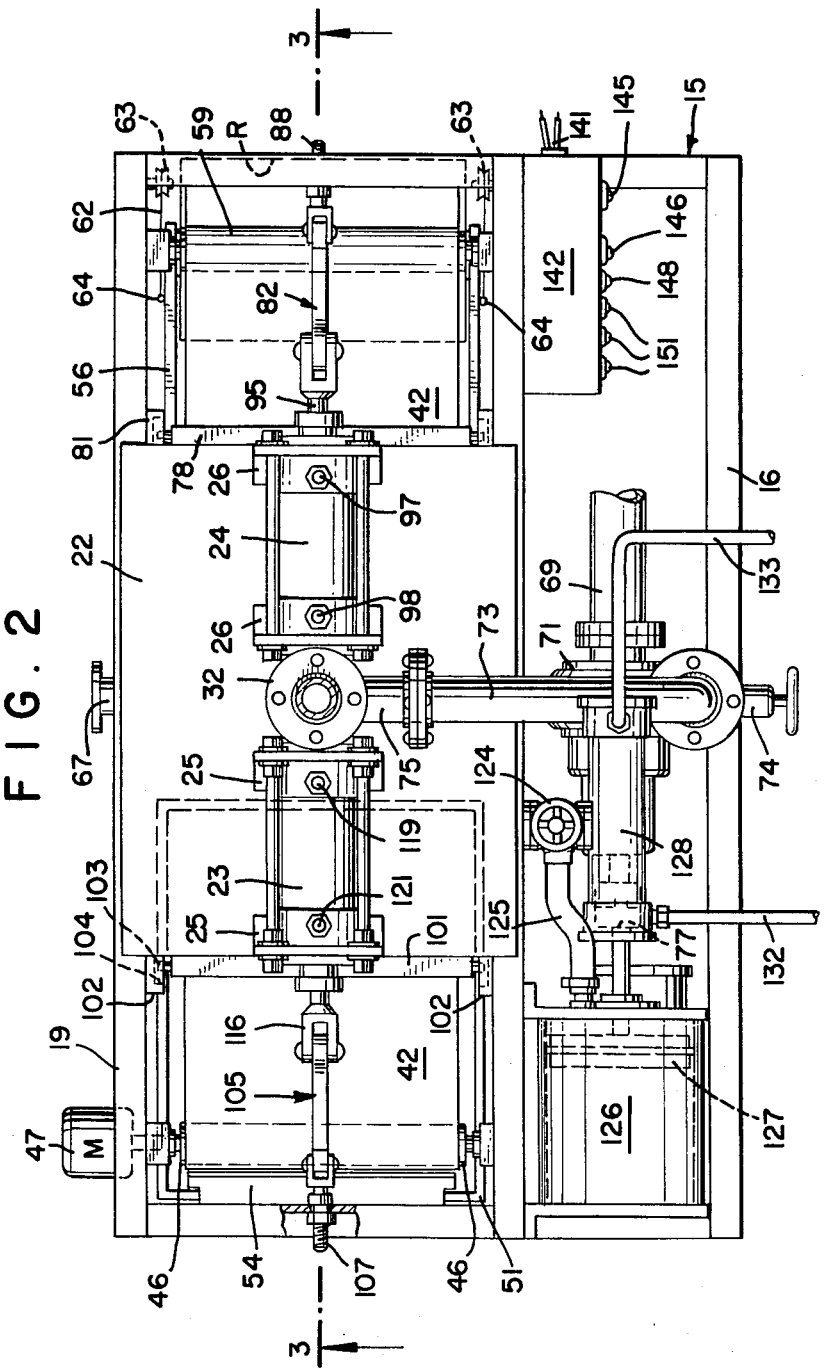

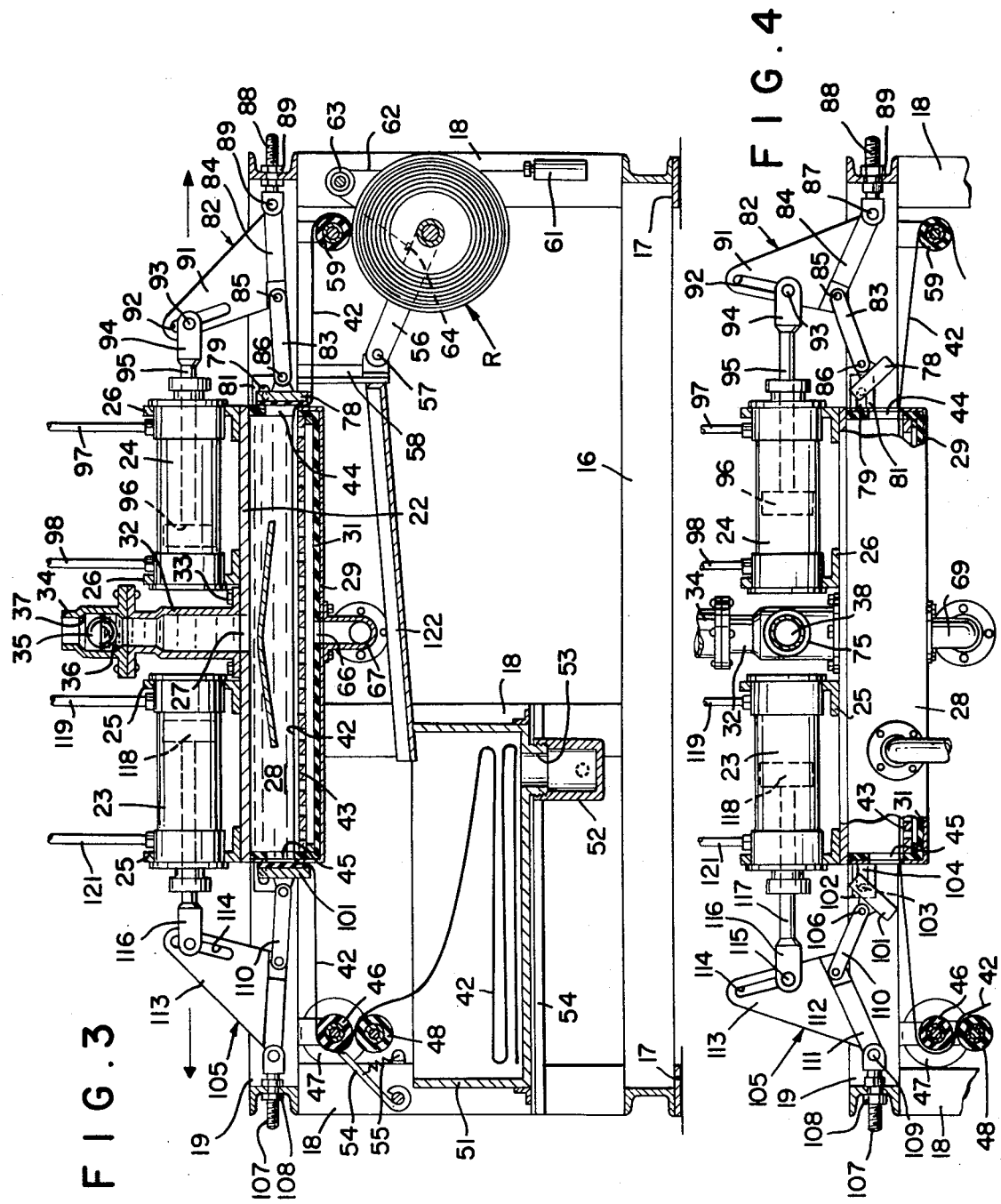

*INVENTOR.*
IRVING PISTINER

BY Polachek, Saulsbury & Hough
ATTORNEYS

LIQUID FILTERING APPARATUS

This invention relates to a liquid filtering apparatus of a travelling filter sheet type.

It is the principal object of the present invention to provide a self contained liquid filtering apparatus of the travelling filter sheet type that is self contained and which will include of itself on the same frame structure an evacuating device for removal of liquid from the filtering chamber when the filtering sheet is to be changed and to return the liquid to the filtering chamber thereafter.

It is another object of the invention to provide a simple and compact mechanism for actuating end gates provided at the end of the filtering chamber through which the paper filter sheet is advanced and which will serve to tightly secure the end gates in a seal type manner against the end walls of the filtering chamber and the paper lying under the lower edge of the gates.

It is another object of the invention to provide in a self contained liquid filtering apparatus of the travelling sheet type motor operated pump mechanism for the return of the filtered liquid to the filtering chamber in order that it may be refiltered after the one filtering operation.

It is a further object of the invention to provide a self contained liquid filtering apparatus wherein there is cylinder actuating devices and control valves as well as the electric control box, are all provided upon the same frame structure, easily accessible, including a pump and electric drive motors for the pump and the travelling filter sheet all of which are mounted upon the apparatus whereby the apparatus can be placed in a liquid supply line and from which filtered liquid can be delivered to a tank reservoir for refiltering or can continue in the liquid source line to a point where filtered liquid is desired.

Other objects of the invention are to provide a self-contained liquid filtering apparatus, having the above objects in mind, which is of simple construction, has a minimum number of parts, easy to assemble and maintain, consumes little space, easy to operate, effective and efficient in use.

For a better understanding of the invention, reference may be had to the following detailed description taken in connection with the accompanying drawings, in which:

FIG. 2 is a top plan view of the filtering apparatus.

FIG. 3 is a longitudinal sectional view of the apparatus as viewed on line 3—3 of FIG. 2.

FIG. 4 is a fragmentary elevational view showing the opposing water gates at the ends of the filtering chamber lifted therefrom as when the liquid has been removed from the filtering chamber at the time of advancing the filtering material from the roll to provide in the filtering chamber a clean stretch thereof.

Figure 1:
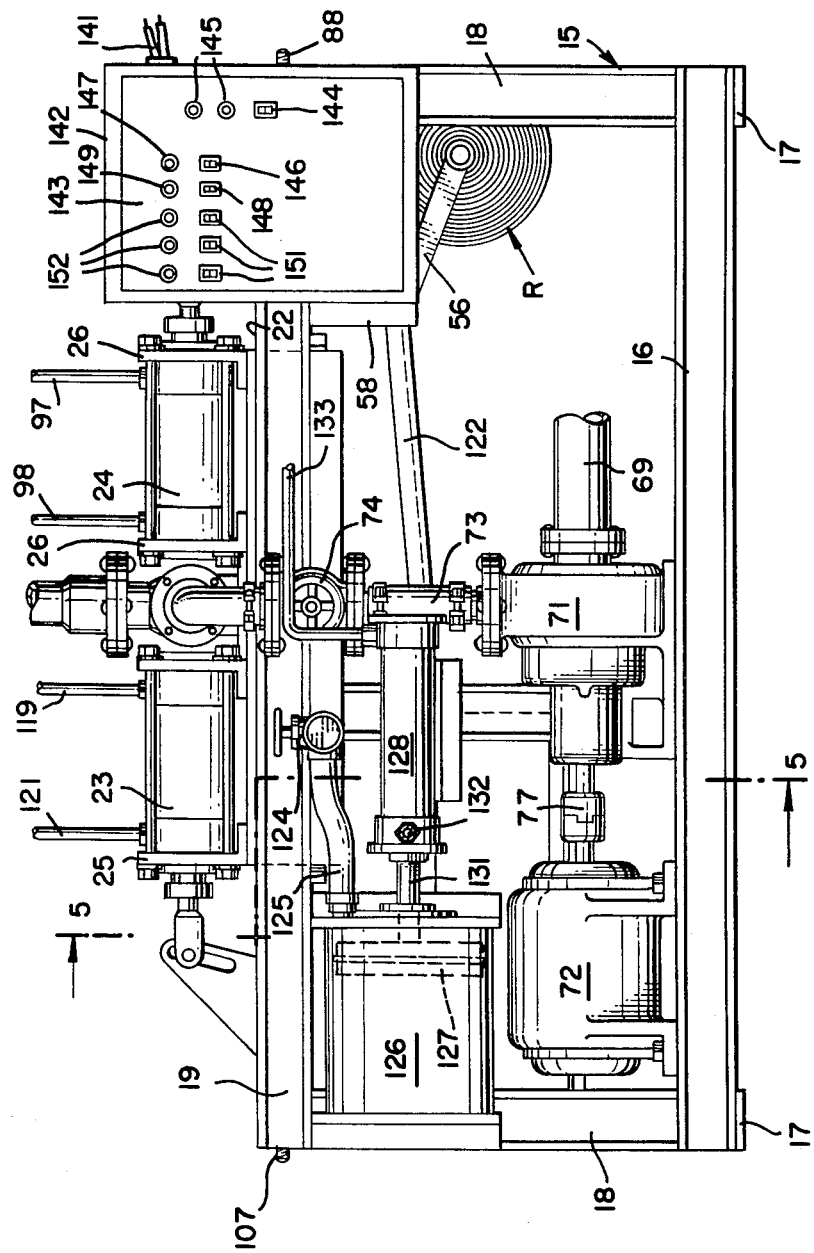
FIG. 1 is a front elevational view of the liquid filtering apparatus embodying the features of the present invention.

Referring now to the drawing, 15 represents generally a supporting frame structure for various parts of the apparatus and which comprises a rectangular shaped bottom structure 16 with bottom pads 17 for the resting of the apparatus upon a floor support. Extending upwardly from each corner of the bottom frame structure 16 are upright frame members 18 which support on their upper ends a rectangular shaped frame 19 of similar shape to the bottom structure 16. The full frame structure 15 is thus an open box frame of rectangular shape in horizontal plane and made up of assembly of standard section stock members, welded together to provide a rigid box frame structure.

Figure 5:
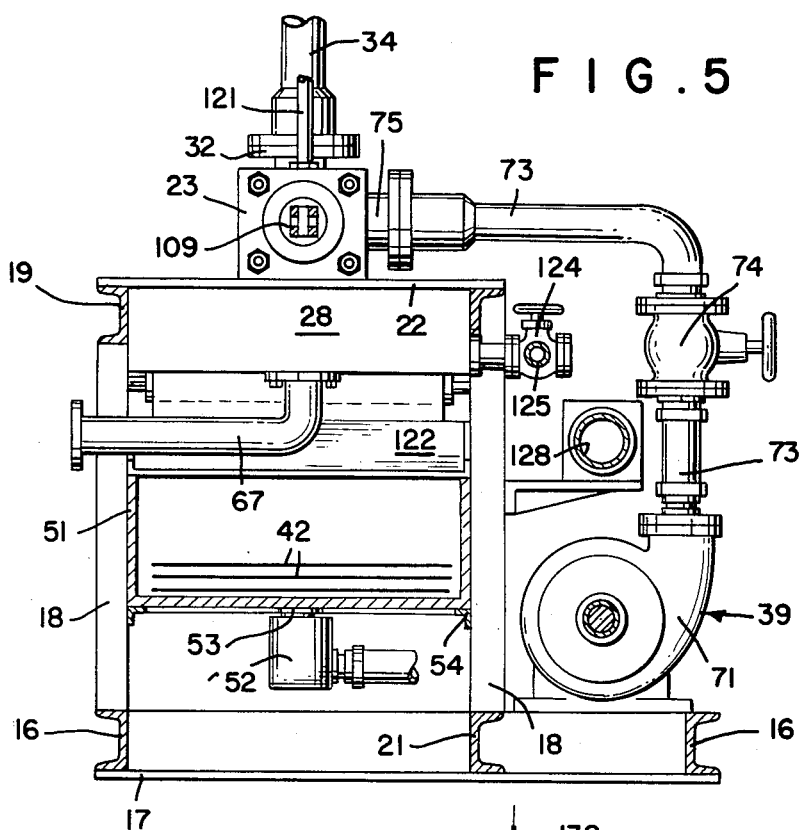
FIG. 5 is a transverse sectional view of the apparatus as viewed on line 5—5 of FIG. 1.

As seen in FIG. 5 the bottom frame 16 includes an intermediate longitudinally extending channel piece 21 upwardly from which vertically extending members 18 extend and above which the smaller top frame 19 is supported, the forward edge of the top frame 19 thereby offsetting the forward edge of the bottom frame 16.

Figure 6:
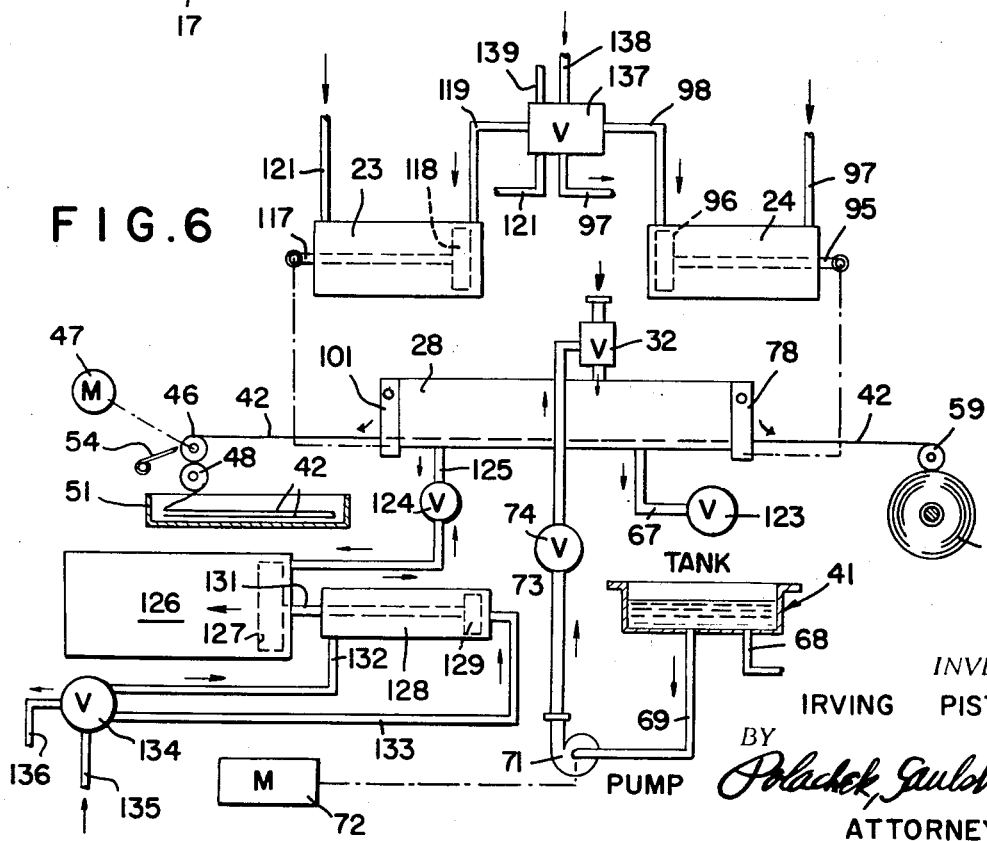
FIG. 6 is a diagrammatic layout including the filtering chamber, the filtering paper roll, the liquid handling pump and vacuum extracting chamber and the several fluid actuating devices for the filter chamber end gates and the liquid evacuator.

Extending from the front to rear of the top frame 19 is a top plate 22 that supports two longitudinally spaced double acting fluid cylinder devices 23 and 24 coextensive with one another and supported thereover on respective end supporting brackets 25 and 26 as best seen in FIGS. 1 and 2. The function of these cylinder actuating devices 23 and 24 will be later described. In the center of the plate 22 is an inlet opening 27 that serves as an inlet for the flow of fluid into a filtering chamber formed from a casing 29 generally of the area of the plate 22 and depending from the lower face thereof and lined with an acid protection covering 31. Extending upwardly over the inlet opening 27 is a flanged fitting 32 secured by bolts 33 to the top of the plate 22. To the top of the fitting 32 is a flange connected pipe line 34 serving as an inlet for the delivery of liquid to be filtered from a main line source. A float valve 35 is provided in the pipeline 34, FIG. 3 to close off the pipeline by seating on a valve seat 36 when the liquid filtering chamber 28 is evacuated at times when the filter paper is changed and in a manner to be described or the ball 35 will be seated against upper seat 37 when the liquid is being delivered to fitting 32 through a front inlet pipe 38 from an auxiliary pump supply arrangement indicated generally at 39 self contained except for its liquid tank source 41, FIG. 6, within the framework 15 of the filtering apparatus unit. This pumping arrangement 39 will later be described more in detail.

Below the inlet hole 27 in the top of plate 22 is a dividing baffle for the flow of liquid entering the chamber 28 and serving to prevent direct engagement of the liquid force upon filter paper material 42 that is extendable over a perforated support plate 43 overlying and slightly spaced from the bottom of the depending chamber casing 29. Paper 42 slides from a fresh roll R of the paper extending before and after the frame structure and at one end thereof. Filter paper 42 is extendable into the chamber 28 and over the perforated plate 43 from an inlet opening 44 and when clogged or dirtied from the uncleaned liquid, is drawn through an end opening 45 at the opposite end of the chamber 28 by a motorized drive roller 46 driven by a motor 47 extending from the rear of the frame structure 19, FIG. 2. The used filter paper is maintained against the roller 46 by a bottom squeegee roller 48 and after the paper passes thereover it is deposited in a tray 51 carried upon the frame structure 15 and has a drain cup or sump 52 depending therefrom and releasably secured to a threaded depending drain projection 53. The tray 51 is supported upon small section longitudinally extending frame members 54 extending between vertical frame members 18 at one end of the frame structure and intermediately the length thereof as can be readily seen in FIG. 3. A scraper 5 is pivotally connected to upright members 18 adjacent the drive roller 46 engages the paper 42 when upon roll 46 to remove debris therefrom and is held thereagainst by a tension spring 55, all as best seen in FIG. 3.

The filter paper roll R at the opposite end of the apparatus is journaled upon a pivoted support frame 56 pivotally connected at 57 to depending frame members 58 and is weight-balanced against a feed roller 59 by a weight 61 carried on a pulley rope 62 and extended over a pulley 63 and connected at 64 to the pivot support frame 56. The roller 59 supports the clean filter paper 42 at the one end of the apparatus and at the same horizontal elevation as the drive roller 46 located at the opposite end of the apparatus over which the dirtied filter paper is drawn against the resistance of the feed roller 59 and weight 61.

In the bottom of the filter chamber casing 29 and in the liner material 31 is an outlet opening 66 and to which a flanged outlet fitting 67 is connected. The filtered liquid, such as acid, oil or any other filterable liquid is removed free of undesirable material and delivered to the tank 41, FIG. 6 from which it can be delivered by a drain pipe 68 to a main line or if desired, the filtered liquid can be pumped from the filter chamber and from the fitting 67 without entering tank 41. The liquid is delivered to the tank 41 when it may be desired to refilter liquid. At this time, the liquid is taken from the bottom of tank 41 through a drain pipe 69 and delivered to pump 71 driven by large motor 72 and directed upwardly under pressure through pipe 73, past hand valve 74 to a side fitting connection 75 on top of inlet fitting 32 whereby at this time the ball valve 35 will be lifted against its seat 34 from a normally neutral elevated position. Pump 71 and the motor 72 axially coupled by a releasable coupling device 77, FIG. 1, and both the pump and the motor are supported on the bottom rectangular support frame 16.

The front and rear walls of the filter chamber casing 79 are continuously closed while the end walls have the openings 44 and 45 for the addition of the filter paper 42 and the discharge of the used or dirtied filter paper from off the perforated support plate 43. The inlet opening 44 can be closed to hold the liquid within the filtering chamber 28 by a retractable and manipulable door 78 pivotally connected at its upper end in an elongated slot 79 of side brackets 81 while its lower edge is pressed against the paper 42 while extended upwardly from its lower edge and against the outerend of the casing 29 at the lower edge of the opening 44 and by a toggle lift mechanism 82 comprising toggle links 83 and 84 pivotally connected to each other at 85 and respectively to the door 78 at 86 and at 87 to the inner end of a bolt 88 secured to the upper frame 19 by lock nuts 89. Fixed to the link 87 and extending upwardly therefrom is a slotted vertically extending plate 91 having an elongated vertically extending slot 92 that is connected by a pin 93 to a bifurcated head 94 of a piston rod 95 extending from a piston 96 operable within the cylinder device 24. Fluid under pressure can be delivered and discharged to opposite sides of the piston 96 through pipelines 97 and 98. When it is desired to open the door gate 78 as when new paper is to be supplied to the filtering chamber 28, fluid under pressure is fed to the cylinder 24 through the pipeline 98 while discharge is being effected through opposite end pipeline 97 so that the piston rod 95 is extended to work the vertically extending plate 91 to a rearward position as shown in FIG. 4 and to cause the gate 78 to be retracted and lifted upwardly to provide full clearance for movement of the paper sheet 42 into the filter chamber 28 from the paper roll R.

At the same time when the paper is to be at or pulled through the filtering chamber 28, the opening 45 st the opposite end of the filtering chamber 28 is opened. This opening 45 is normally closed while the filtering chamber is filled with liquid by a retractable and upwardly pivotable closure door or gate 101 adapted to normally have its lower edge effect sealing engagement with the filtering paper 42 and the casing 29 at the lower edge of the opening 45. This gate 101 is carried upon brackets 102 by pins 103 extending into elongated bracket opening 104. A toggle mechanism 105 extends between the door gate 101 to which it is pivotally connected at 106 and to the inner end of an adjustable bolt 107 secured to the frame 19 in an adjusted position by lock nuts 108 and to the inner end of which the toggle mechanism 105 is connected by a pivot pin 109. The toggle mechanism 105 has links 110 and 111 that are pivotally connected to one another at 112 and to a vertically extending plate 113 that has a vertically extending slot 114 through which there is extended a pin 115 that connects a bifurcated head 116 of the piston rod 117 extending from a piston 118 operable within the cylinder device 23. This cylinder device is actuated by fluid extended to and exhausted from the device through pipelines 119 and 121. Accordingly when the pistons 96 and 108 of the respective cylinder devices 23 and 24 are operated in an opposing manner the filtering chamber openings 44 and 45 will be closed and sealed against the filtering paper lying over the perforated plate 43 within the chamber and through which the liquid being filtered is forced. When it is desired to change the paper area within the filtering chamber, the door gates 78 and 79 at the opposite ends of the filtering chamber 24 are retracted and lifted by their respective toggle mechanisms 82 and 105 thereby allowing the paper 42 to be drawn through the filtering chamber by the motor operated drive roller 46. This filtering paper is reinforced to the extent that it will have the same tension quality whether in the wet or dry state. Both of the cylinder devices 23 and 24 are simultaneously operated when opening and closing the end openings 44 and 45 of the filtering chamber 28. At this time any discharge from the openings 44 and 45 will drain into the paper disposal tray 51. The end opening 45 overlies the disposal tray 51 to receive the drippings directly whereas the opening 44 overlies a downwardly inclined drain plate 122 that is supported on the lower end of the depending members 58 and at its discharge end upon and over the edge of the tray 51, FIG. 3.

Before the end gates 78 and 101 can be opened by their respective cylinders 24 and 23, the liquid overlying the filter paper 42 and lying within the filtering chamber 28 has to be cut off from its source and has to be removed from the filtering space. This is done by closing valve 123, FIG. 6, in the drain line 67 of the filtering chamber 28, valve 74 in the pump line 73 and opening valve 124 in a pipeline 125 leading from the front side of the filtering chamber 28, FIG. 5, to a large vacuum chamber device 126 having a piston 127 actionable by a two way cylinder device 128 which has its piston 129 connected by a piston rod 131 to piston 127. This two way cylinder device is operated by fluid delivered to the opposite ends of the same through pipelines 132 and 133 leading from a reversing fluid valve 134 which in turn has supply and exhaust lines 135 and 136. When the vacuum is effected with the vacuum cylinder 126 to evacuate the filtering chamber 28 float valve 35 will be drawn against its seat 36 to close off the main source of liquid supply. Once the liquid has been removed from the filtering chamber 28 and transferred to the vacuum chamber 126, the end gates 78 and 101 may be opened. This is effected by operating a reversing fluid valve 137, FIG. 6, to which fluid is delivered by pipeline 138 and distributed to the cylinder devices 24 and 23 connected respectively thereto by pipelines 98 and 119 and delivered to the opposite ends of the cylinder devices 23 and 24 and pipelines 97 and 121 to thereafter, when the paper 42 has been changed, close the gates 78 and 101 upon the new paper area. The valve 137 has an exhaust pipe 139 where air is the actuating fluid for the devices 23 and 24.

Just as soon as the filtering chamber has been exhausted of filtering liquid and the gates 78 and 101 have been opened, motor 47 for the drive roller 46 is started to pull the paper 42 and the used area thereof from the filtering chamber to overlie the perforated plate 43 with a new clean paper area for the filtering purpose. When this has been effected the motor 47 is stopped and thereafter the end gates 78 and 101 are closed by their toggle mechanisms 82 and 105 to seal the filtering paper against the ends of the filtering chamber at the openings 44 and 45 whereby the filtering chamber will again be tightly closed. Thereafter the valve 34 will be turned to change the movement of the piston 129 in the work cylinder 128 and to cause the vacuum piston 127 to be returned to the position shown in FIG. 6 and to thereby through the pipeline 125 return the liquid to the filtering chamber and so that it can be filtered through the new clean area of filtering paper 42. The exhaust valve 124 is thereafter closed. The float valve 35 in the main pipeline 34 will be lifted against its seat 37.

If it is desired to refilter the liquid connected in the tank 41 the pump valve 74 will be opened and the pump motor 72 turned on to operate the pump 71 whereby the liquid will be taken from the tank 41 and refiltered. At this time the float valve 35 will be lifted against the seat 37. Once this liquid in the tank 41 has been refiltered a new source of liquid can be taken from the main line source 34, the motor 72 having been turned off to stop the operation of the pump 71 and the valve 74 in the pump line 73 will have been closed.

At one side end of the apparatus is a control box 141 that may contain various electric switch devices from which extend cables 142 for connection with an electric source. Various switch buttons and signal lights are provided on a front door plate. A button switch 144 is operable with signal lamps 145 to actuate a main switch. A switch button 146 and signal lamp 147 control electric motor 47 for causing the adjustment of the filter paper 42 in the filtering chamber 28. Switch button 148 and signal lamp 149 control the operation of the pump motor 72. Switch button 151 taken in conjunction with respective signal lamps 152 may serve to control fluid valves 134 and 137 for the respective fluid actuating sources 128 and 23-24 and magnetically any one of the other hand operated liquid control valves.

While this control box includes electrical switches that control the actuation of the filtering apparatus at the will of the operator, it will be understood that the apparatus may be controlled by an automatic sequence control system operable in response to pressure of the filtering mechanism required to penetrate the filter paper. Upon the pressure of the liquid being increased indication will be given of the need for a change in the filtering operation and thus instead of the valves and electric motors being operated at the will of the operator they will be operated in sequence to effect first the closing of the valves in the pump and drain lines of the filtering chamber, second the evacuation of the filtering chamber, thereafter the opening of the end gates and finally the moving of the paper 42 by the motor 47. A reverse procedure then would be followed to shut off the motor 47, close the end gates 78 and 101 and thereafter return the evacuated liquid to the filtering chamber 28 from the vacuum cylinder 126.

While various changes may be made in the detailed construction of the apparatus, it is to be understood that such changes will be made within the spirit and scope of the present invention as defined by the appended claims.

What is claimed is:

1. A filtering apparatus comprising a supporting frame structure, a top supporting plate overlying the frame structure, a filtering chamber having open end walls and a closed bottom wall, a roll of filtering paper, means for supporting the roll of filtering paper upon the frame structure and leading to one opening of the filtering chamber, said filtering paper extendable through the opposite opening of the filtering chamber, a drive roller receiving the filtering paper and operable to replace the filtering area of the paper within the filtering chamber, said filtering chamber having a liquid inlet for the liquid to be filtered and a drain outlet for the filtered liquid underlying the filter paper, end gate members aligned and operable respectively with the opposite end openings and operable in an opposing manner to close the filtering chamber end openings and to seal the filtering paper extended therethrough upon the filtering chamber, and opposing gate actuating mechanisms overlying the filtering chamber and connected respectively to the pivotable end gates to open and close the same and an evacuating device connected to the filtering chamber to remove the liquid therefrom at times prior to the opening of the end gates and the shifting of the filtering paper and to return the liquid to the filtering chamber upon the end gate openings being closed upon the filtering paper.

2. A liquid filtering apparatus as defined in claim 1, and said end gates operating devices including fluid operating piston cylinders supported upon the top plate of the frame structure and toggle link mechanism respectively extending from the respective cylinder devices to the respective opposing end gates and said liquid evacuating apparatus including a large evacuating cylinder with a valve controlled pipeline extending between the filtering chamber and the evacuating cylinder and a fluid actuating cylinder device connected to the evacuating cylinder to actuate the same for extracting liquid from the filtering chamber and returning the liquid to the same.

3. A liquid filtering apparatus as defined in claim 2, and said main inlet including a float valve having upper and lower valve seats and said float valve being operable in response to the actuation of the evacuating cylinder device to automatically close the main inlet ball float valve.

4. A liquid filtering apparatus as defined in claim 1, and a liquid receiving tank for receiving the filtered liquid and a pump and valve controlled pipeline for returning the liquid to the filtering chamber to be refiltered.

5. A liquid filtering apparatus as defined in claim 4, and said main inlet to the filtering chamber including a ball float valve, said valve having a seat against which the valve will be seated upon the pump being actuated to return the liquid from the tank to the filtering chamber to be refiltered.

6. A liquid filtering apparatus as defined in claim 4, and said drive roller for the filter paper having an electric motor to operate the same and said liquid return pump having a motor for operating the same and a control box carried on the frame structure and including electric switches for effecting the actuation of the drive roll and return pump motors.

7. A liquid filtering apparatus as defined in claim 1, and said filtering chamber and gates being respectively pivotally connected to the ends of the filtering chamber for upward pivotal movement from the paper and outward retractable movements at their pivot connections from the filtering chamber and a perforated support for the filtering paper underlying the filtering paper and extending between the end gate openings of the filtering chamber, said lower edges of the end gates serving to fold downwardly the paper over the ends of the perforated support plate therefore and onto the end faces of the filtering chamber and at the lower sides of the openings.

8. A liquid filtering apparatus as defined in claim 1, and said drive roller for withdrawing the paper through the filtering chamber being motorized and a disposal tray underlying the motorized roller for receiving the dirtied used filtering paper.

9. A liquid filtering apparatus as defined in claim 8, and said disposal tray underlying one of the end openings of the filtering chamber and an inclined drain board extending from the other opening of the filtering chamber toward said paper disposal tray for receiving any excess liquid from the filtering end openings when the gates have been opened and a drain sump extending downwardly from a paper disposal tray.

* * * * *